Nov. 23, 1943. W. A. SPIERS 2,334,847
PORTABLE COOKING DEVICE
Filed April 24, 1940

INVENTOR
Walter A. Spiers
BY Willard D. Eakin
Attorney

Patented Nov. 23, 1943

2,334,847

UNITED STATES PATENT OFFICE 2,334,847

PORTABLE COOKING DEVICE

Walter A. Spiers, Akron, Ohio

Application April 24, 1940, Serial No. 331,336

5 Claims. (Cl. 126—25)

This invention relates to portable cooking devices and its chief objects are to provide a combination picnic basket and broiler and preferably also an oven.

Further objects are simplicity, lightness, convenience of operation and economy of construction, and to provide a self-contained assembly in which both the fuel and the foodstuffs can be conveniently carried to the place at which they are to be used.

Figure 1:
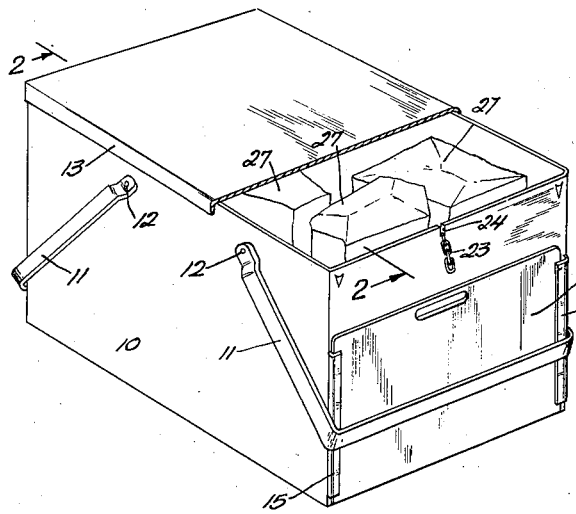
Fig. 1 is a perspective view, with a part broken away, of an embodiment of my invention in its preferred form, as used for a picnic basket, with a supply of foodstuffs therein.

Referring to the drawing, the assembly comprises a box-like, sheet-metal main container 10 provided with a pair of carrying bails 11, 11 hinged to it as at 12, 12; with a rain-proof flanged lid 13; and with a vertically sliding end door 14 permitting the lower part of the space within the main container to be employed as an oven, if desired. The door 14 fits, preferably with some frictional resistance to its sliding movement, in guide-ways 15, 15 secured to the outer face of an end-wall of the main container, so that if desired the friction will hold the door in a slightly raised condition to provide a draft through the main container, but I find that such special provision for a draft is not necessary, especially after a supply of fuel in the fuel-container hereinafter described has become well ignited.

Within the main container is a charcoal trough 16, preferably of triangular trough cross-section. Preferably it is formed of two sloping side members 17, 17 formed along their upper margins with vertical stiffening flanges 18, 18 and along their lower margins with horizontal stiffening flanges 19, 19, and with draft apertures 20, 20.

At their ends the side members 17 are secured to end-wall members 21, 21, which are provided at their upper margins with outwardly projecting flanges 22, 22 which serve both as stiffening flanges and as spacers for keeping the hot end-walls of the charcoal trough a suitable distance from the end-walls of the main container 10.

The charcoal trough is adapted to be supported at suitable different heights by chains 23, 23 secured to its end walls 21 respectively and adapted to be engaged in notches such as the notch 24 (Fig. 1 or 7) formed in the upper margins of the end walls of the main container.

Figure 2:
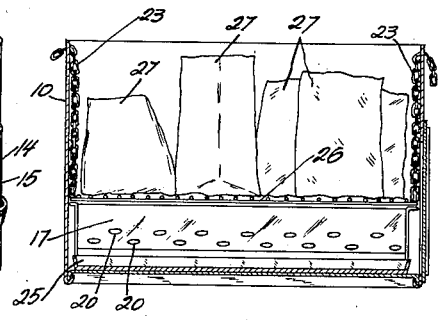
Fig. 2 is a longitudinal section of the same, on line 2—2 of Fig. 1.
Figure 4:
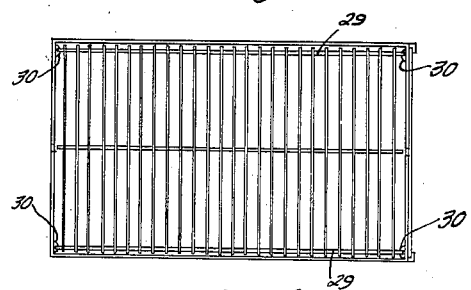
Fig. 4 is a plan view of the main container and the broiler grid only, in the positions in which they are shown in Fig. 3.

In Figs. 1 and 2 the charcoal trough 16 is in its lowermost position, resting upon an oven pan 25 (Figs. 2, 3 and 7), to provide above it, and above a broiler grid 26 resting upon it (Fig. 2), space for a supply of foodstuffs 27.

Figure 3:
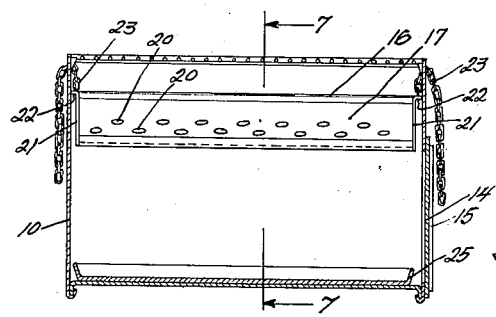
Fig. 3 is a longitudinal section of the assembly on line 3—3 of Fig. 7, the parts here being shown in the relative positions which they occupy when the device is used as a broiler and oven.
Figure 7:
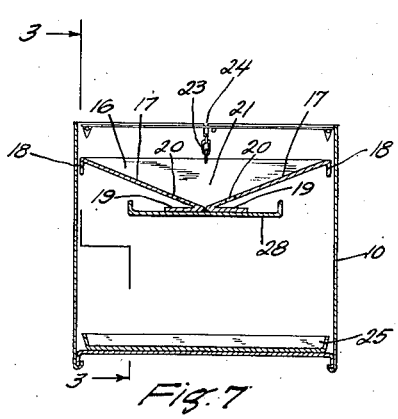
Fig. 7 is a cross-section on line 7—7 of Fig. 3.

In Figs. 3 and 7 the charcoal trough 16 is shown suspended by the chains 23 in a higher position such as it occupies when the assembly is being used for broiling or baking or both.

To prevent ashes from falling onto the baking pan 25 or its contents an ash pan 28 is secured to the lower flanges 19 of the charcoal trough.

Figure 5:
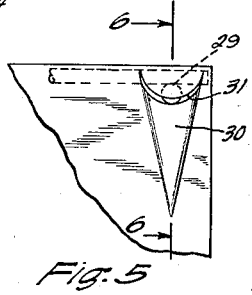
Fig. 5 is a fragmentary external view of a part of one end-wall of the main container showing preferred means for supporting the broiler grid.
Figure 6:
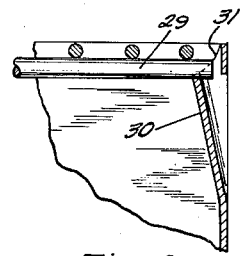
Fig. 6 is a section on line 6—6 of Fig. 5.

The broiler grid 26 comprises longitudinal side wires 29, 29 adapted to rest at their ends upon stamped and bent-in half-cone ears 30, 30 integral with the end-walls of the main container 10. The cut for the stamping or bending in of these ears 30 is preferably of curved form, as shown clearly at 31 in Figs. 5 and 6, so that when the ear has been formed its upper edge will be lowest in its middle portion, for stable positioning of the side wire 29 of the broiler grid.

The construction described is such that by lifting the broiler grid 26 from the ears 30 and then passing one end of it down, past the adjacent ears 30, a little ahead of its other end, the grid can be brought to the grocery-supporting position in which it is shown in Fig. 2.

The advantages of the invention are indicated in the above statement of objects, and various modifications are possible without sacrifice of all of them and without departure from the scope of the invention as defined in the appended claims.

I claim:

1. A portable cooking device comprising a main container, a fuel container therein, means for supporting the fuel container at different elevations therein, and means for supporting articles to be cooked in heat-receiving relation to the fuel container, the said article-supporting means being adapted to be lowered to the vicinity of the fuel container when the latter is in its lowermost position and means on the main container interlocking with it to support it at a higher position above the fuel container.

2. A portable cooking device comprising a main container, a fuel container therein, means for supporting the fuel container at different elevations therein, and means for supporting articles to be cooked in heat-receiving relation to the fuel container, the said article-supporting means being adapted to be lowered to the vicinity of the fuel container when the latter is in its lowermost position, and means on the main container interlocking with it to support it at a higher position above the fuel container, the fuel container being formed with inwardly sloping walls and with draft apertures.

3. A portable cooking device comprising a main container, a fuel container therein, means for supporting the fuel container at different elevations therein such as to provide a cooking space below it, in the main container, and an ash pan mounted under the fuel container and secured to and thus supported by the fuel container so as to be held above said cooking space when the fuel container is in a high position.

4. A portable cooking device comprising a main container, a fuel container therein, means for supporting the fuel container at different elevations therein, means for supporting articles to be cooked in heat-receiving relation above the fuel container, the parts being so proportioned as to provide an oven space below the fuel container in the main container when the fuel container is above its lowermost position, and ash-catching means interposed between said oven space and the fuel container.

5. A portable cooking device comprising a main container, a fuel container therein, means for supporting the fuel container at different elevations therein, means for supporting articles to be cooked in heat-receiving relation above the fuel container, the parts being so proportioned as to provide an oven space below the fuel container in the main container when the fuel container is above its lowermost position, and the main container being provided with an oven door giving access to said oven space, and ash-catching means interposed between the oven space and the fuel container and secured to the latter to be raised and lowered therewith.

WALTER A. SPIERS.